US012367902B2

(12) United States Patent
Nishida

(10) Patent No.: US 12,367,902 B2
(45) Date of Patent: Jul. 22, 2025

(54) NONCONTACT COMMUNICATION MEDIUM, MAGNETIC TAPE CARTRIDGE, NONCONTACT COMMUNICATION SYSTEM, OPERATION METHOD OF NONCONTACT COMMUNICATION MEDIUM, AND PROGRAM

(71) Applicant: FUJIFILM CORPORATION, Tokyo (JP)

(72) Inventor: Kenji Nishida, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/884,135

(22) Filed: Sep. 13, 2024

(65) Prior Publication Data

US 2025/0095677 A1    Mar. 20, 2025

(30) Foreign Application Priority Data

Sep. 20, 2023    (JP) ................. 2023-153492

(51) Int. Cl.
| | |
|---|---|
| *G11B 5/55* | (2006.01) |
| *G11B 5/02* | (2006.01) |
| *G11B 5/58* | (2006.01) |
| *G11B 15/18* | (2006.01) |
| *H04B 5/26* | (2024.01) |
| *H04B 5/43* | (2024.01) |
| *H04B 5/79* | (2024.01) |

(52) U.S. Cl.
CPC ............. *G11B 5/582* (2013.01); *G11B 5/02* (2013.01); *H04B 5/263* (2024.01); *H04B 5/43* (2024.01); *H04B 5/79* (2024.01)

(58) Field of Classification Search
CPC . G11B 5/5508; G11B 15/1883; G11B 15/605; G11B 7/24097
USPC .......................................................... 360/93
See application file for complete search history.

(56) References Cited

U.S. PATENT DOCUMENTS

| | | | |
|---|---|---|---|
| 7,929,265 B2 * | 4/2011 | Brandl | G06K 19/0701 |
| | | | 361/56 |
| 2008/0266729 A1 | 10/2008 | Brandl et al. | |

FOREIGN PATENT DOCUMENTS

| | | |
|---|---|---|
| JP | 2006-323918 A | 11/2006 |
| JP | 2009-519699 A | 5/2009 |

* cited by examiner

*Primary Examiner* — Nabil Z Hindi
(74) *Attorney, Agent, or Firm* — SOLARIS Intellectual Property Group, PLLC

(57) ABSTRACT

A noncontact communication medium performs communication with an external device in a noncontact manner. The noncontact communication medium includes a resonance circuit, a regulator that generates operating power, a variable resistor, a switcher, and a control circuit. The processing circuit generates a response signal corresponding to a command signal. The switcher switches between an applied state in which a load of the variable resistor is applied to the resonance circuit and a non-applied state in which the load is not applied to the resonance circuit, according to the response signal. The control circuit controls the resistance value according to the bleed power dissipated from the regulator.

10 Claims, 10 Drawing Sheets

NONCONTACT COMMUNICATION MEDIUM, MAGNETIC TAPE CARTRIDGE, NONCONTACT COMMUNICATION SYSTEM, OPERATION METHOD OF NONCONTACT COMMUNICATION MEDIUM, AND PROGRAM

CROSS-REFERENCE TO RELATED APPLICATIONS

This application claims priority under 35 USC 119 from Japanese Patent Application No. 2023-153492, filed on Sep. 20, 2023, the disclosure of which is incorporated by reference herein.

BACKGROUND

1. Technical Field

The present disclosure relates to a noncontact communication medium, a magnetic tape cartridge, a noncontact communication system, an operation method of a noncontact communication medium, and a program.

2. Related Art

JP2006-323918A discloses a technique of recording related information of data recorded on a magnetic tape provided in a magnetic recording tape cartridge, on a noncontact memory IC tag provided in the magnetic recording tape cartridge.

JP2009-519699A discloses a radio frequency interface circuit for a radio frequency identification tag. The radio frequency interface circuit described in JP2009-519699A comprises: at least one input terminal pair through which the interface circuit is connected to an antenna unit of the radio frequency identification tag; one or more variable resistance loads coupled to the input terminal pair; one or more rectifiers of which an input side is connected to the input terminal pair and an output side is connected to parallel connection of a voltage control unit and a modulation control unit; and a combining unit that receives an output signal from the voltage control unit and the modulation control unit. The combining unit is configured to generate a control signal for controlling each variable resistance load according to a reception signal such that each variable resistance load operates as modulation and voltage adjustment circuits, and is configured such that each variable resistance load acts as an electrostatic discharge protection circuit.

In addition, in the radio frequency interface circuit described in JP2009-519699A, the combining unit detects an overvoltage state from the output signal received from the voltage control unit and generates a control signal for setting each variable resistance load to a value for limiting an input voltage of each rectifier. Further, the combining unit modulates the control signal in accordance with the output signal received from the modulation control unit in order to transmit data through the antenna unit of the radio frequency identification tag, and modulates a resistance value of each variable resistance load.

SUMMARY

One embodiment according to the present disclosure provides a noncontact communication medium, a magnetic tape cartridge, a noncontact communication system, an operation method of a noncontact communication medium, and a program capable of achieving both stabilizing supply of operating power to a processing circuit and ensuring that an external device accurately reads a content of a response signal.

According to a first aspect of the present disclosure, there is provided a noncontact communication medium that performs communication with an external device in a noncontact manner via a magnetic field provided from the external device, the noncontact communication medium comprising: a resonance circuit that generates an alternating current voltage by resonating using an induced current induced in an antenna coil by the magnetic field acting on the antenna coil; a regulator that generates operating power for operating a processing circuit, from power based on a direct current voltage obtained by rectifying the alternating current voltage; a variable resistor connected to the resonance circuit; a switcher; and a control circuit, in which the processing circuit generates a response signal corresponding to a command signal that is provided from the external device via the magnetic field, the switcher switches between an applied state in which a load of the variable resistor is applied to the resonance circuit, and a non-applied state in which the load is not applied to the resonance circuit, according to the response signal, and the control circuit controls a resistance value of the variable resistor according to a bleed power dissipated from the regulator, to generate the operating power.

According to a second aspect of the present disclosure, in the noncontact communication medium according to the first aspect, the processing circuit executes processing corresponding to the command signal, and outputs a signal indicating a result obtained by executing the processing, as the response signal.

According to a third aspect of the present disclosure, in the noncontact communication medium according to the first or second aspect, the variable resistor is a pair of variable resistance elements connected to the resonance circuit, the switcher is a pair of switches that correspond to the pair of variable resistance elements and that are capable of connecting the pair of variable resistance elements and a ground potential to each other, the applied state is achieved in a case in which the pair of switches are turned on, and the non-applied state is achieved in a case in which the pair of switches are turned off.

According to a fourth aspect of the present disclosure, in the noncontact communication medium according to any one of the first to third aspects, the control circuit reduces, in a case in which the bleed power is increased, the resistance value in accordance with the increase in the bleed power, and increases, in a case in which the bleed power is decreased, the resistance value in accordance with the decrease in the bleed power.

According to a fifth aspect of the present disclosure, in the noncontact communication medium according to any one of the first to fourth aspects, a memory to which information is written by the processing circuit and/or from which information is read by the processing circuit is further provided.

According to a sixth aspect of the present disclosure, in the noncontact communication medium according to any one of the first to fifth aspects, the noncontact communication medium is mounted in a magnetic tape cartridge.

According to a seventh aspect of the present disclosure, there is provided a magnetic tape cartridge comprising: the noncontact communication medium according to any one of the first to sixth aspects.

According to an eighth aspect of the present disclosure, there is provided a noncontact communication system comprising: the noncontact communication medium according to any one of the first to sixth aspects; and the external device.

According to a ninth aspect of the present disclosure, there is provided an operation method of a noncontact communication medium that performs communication with an external device in a noncontact manner via a magnetic field provided from the external device, the noncontact communication medium including a resonance circuit that generates an alternating current voltage by resonating using an induced current induced in an antenna coil by the magnetic field acting on the antenna coil, a regulator that generates operating power for operating a processing circuit, from power based on a direct current voltage obtained by rectifying the alternating current voltage, a variable resistor connected to the resonance circuit, a switcher, and a control circuit, the operation method comprising: generating, via the processing circuit, a response signal corresponding to a command signal that is provided from the external device via the magnetic field; switching, via the switcher, between an applied state in which a load of the variable resistor is applied to the resonance circuit, and a non-applied state in which the load is not applied to the resonance circuit, according to the response signal; and controlling, via the control circuit, a resistance value of the variable resistor according to a bleed power dissipated from the regulator, to generate the operating power.

According to a tenth aspect of the present disclosure, there is provided a program for causing a computer provided in a noncontact communication medium that performs communication with an external device in a noncontact manner via a magnetic field provided from the external device, to execute a modulation process, in which the noncontact communication medium includes a resonance circuit that generates an alternating current voltage by resonating using an induced current induced in an antenna coil by the magnetic field acting on the antenna coil, a regulator that generates operating power for operating a processing circuit, from power based on a direct current voltage obtained by rectifying the alternating current voltage, a variable resistor connected to the resonance circuit, and a switcher, the processing circuit generates a response signal corresponding to a command signal that is provided from the external device via the magnetic field, the switcher switches between an applied state in which a load of the variable resistor is applied to the resonance circuit, and a non-applied state in which the load is not applied to the resonance circuit, according to the response signal, and the modulation process includes controlling a resistance value of the variable resistor according to a bleed power dissipated from the regulator, to generate the operating power.

BRIEF DESCRIPTION OF THE DRAWINGS

Exemplary embodiments of the technology of the disclosure will be described in detail based on the following figures, wherein.

DETAILED DESCRIPTION

Hereinafter, examples of embodiments of a noncontact communication medium, a magnetic tape cartridge, a noncontact communication system, an operation method of a noncontact communication medium, and a program according to the present disclosure will be described with reference to the accompanying drawings.

First, the term used in the following description will be described.

CPU indicates the abbreviation for "central processing unit". RAM indicates the abbreviation for "random access memory". DRAM indicates the abbreviation for "dynamic random access memory". NVM indicates the abbreviation for "non-volatile memory". EEPROM indicates the abbreviation for "electrically erasable and programmable read only memory". SSD indicates the abbreviation for "solid state drive". HDD indicates the abbreviation for "hard disk drive". ASIC indicates the abbreviation for "application specific integrated circuit". PLD indicates the abbreviation for "programmable logic device". FPGA indicates the abbreviation for "field-programmable gate array". IC indicates the abbreviation for "integrated circuit". RFID indicates the abbreviation for "radio frequency identifier". UI indicates the abbreviation for "user interface".

Figure 1:
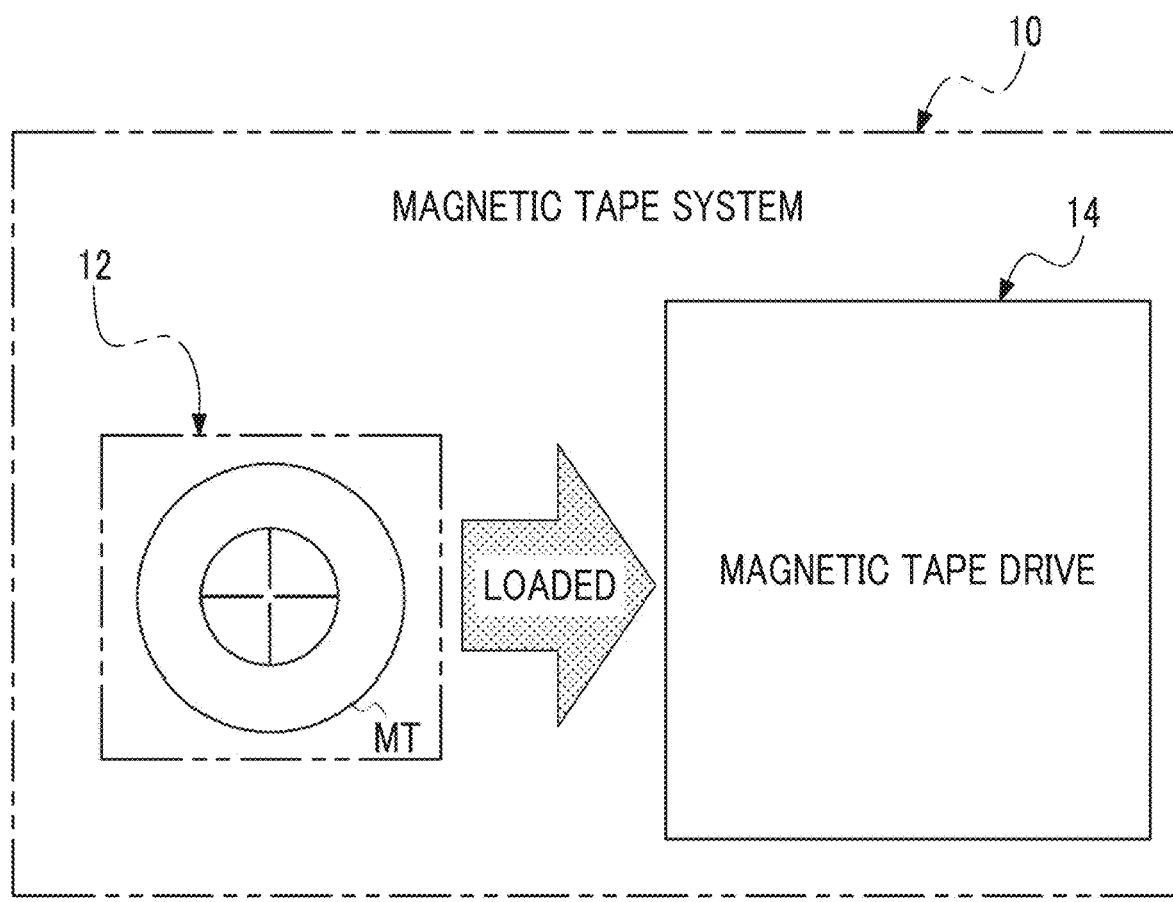
FIG. 1 is a conceptual diagram showing an example of a configuration of a magnetic tape system.

As shown in FIG. 1 as an example, a magnetic tape system 10 comprises a magnetic tape cartridge 12 and a magnetic tape drive 14. The magnetic tape drive 14 is loaded with the magnetic tape cartridge 12. The magnetic tape cartridge 12 accommodates a magnetic tape MT. The magnetic tape drive 14 extracts the magnetic tape MT from the loaded magnetic tape cartridge 12, and records data onto the magnetic tape MT or reads data from the magnetic tape MT while the extracted magnetic tape MT is running.

In the present embodiment, the magnetic tape cartridge 12 is an example of a "magnetic tape cartridge" according to the present disclosure, and the magnetic tape system 10 is an example of a "noncontact communication system" according to the present disclosure.

Next, an example of a configuration of the magnetic tape cartridge 12 will be described with reference to FIGS. 2 to 4. In the following description, for convenience of description, in FIGS. 2 to 4, a direction of loading the magnetic tape cartridge 12 into the magnetic tape drive 14 is indicated by an arrow A, a direction of the arrow A is denoted as a front direction of the magnetic tape cartridge 12, and a side of the magnetic tape cartridge 12 in the front direction is denoted as a front side of the magnetic tape cartridge 12. In the description of the structure to be shown below, "front" indicates the front side of the magnetic tape cartridge 12.

Additionally, in the following description, for convenience of description, in FIGS. 2 to 4, a direction of an arrow B that is perpendicular to the direction of the arrow A is denoted as a right direction, and a side of the magnetic tape cartridge 12 in the right direction is denoted as a right side of the magnetic tape cartridge 12. In the description of the structure to be shown below, "right" indicates the right side of the magnetic tape cartridge 12.

Moreover, in the following description, for convenience of description, in FIGS. 2 to 4, a direction opposite to the direction of the arrow B is denoted as a left direction, and a side of the magnetic tape cartridge 12 in the left direction is denoted as a left side of the magnetic tape cartridge 12. In the description of the structure to be shown below, "left" indicates the left side of the magnetic tape cartridge 12.

Further, in the following description, for convenience of description, in FIGS. 2 to 4, a direction perpendicular to the direction of the arrow A and to the direction of the arrow B is indicated by an arrow C, a direction of the arrow C is denoted as an upper direction of the magnetic tape cartridge 12, and a side of the magnetic tape cartridge 12 in the upper direction is denoted as an upper side of the magnetic tape cartridge 12. In the description of the structure to be shown below, "upper" indicates the upper side of the magnetic tape cartridge 12.

Additionally, in the following description, for convenience of description, in FIGS. 2 to 4, a direction opposite to the front direction of the magnetic tape cartridge 12 is denoted as a rear direction of the magnetic tape cartridge 12, and a side of the magnetic tape cartridge 12 in the rear direction is denoted as a rear side of the magnetic tape cartridge 12. In the description of the structure to be shown below, "rear" indicates the rear side of the magnetic tape cartridge 12.

Further, in the following description, for convenience of description, in FIGS. 2 to 4, a direction opposite to the upper direction of the magnetic tape cartridge 12 is denoted as a lower direction of the magnetic tape cartridge 12, and a side of the magnetic tape cartridge 12 in the lower direction is denoted as a lower side of the magnetic tape cartridge 12. In the description of the structure to be shown below, "lower" indicates the lower side of the magnetic tape cartridge 12.

Figure 2:
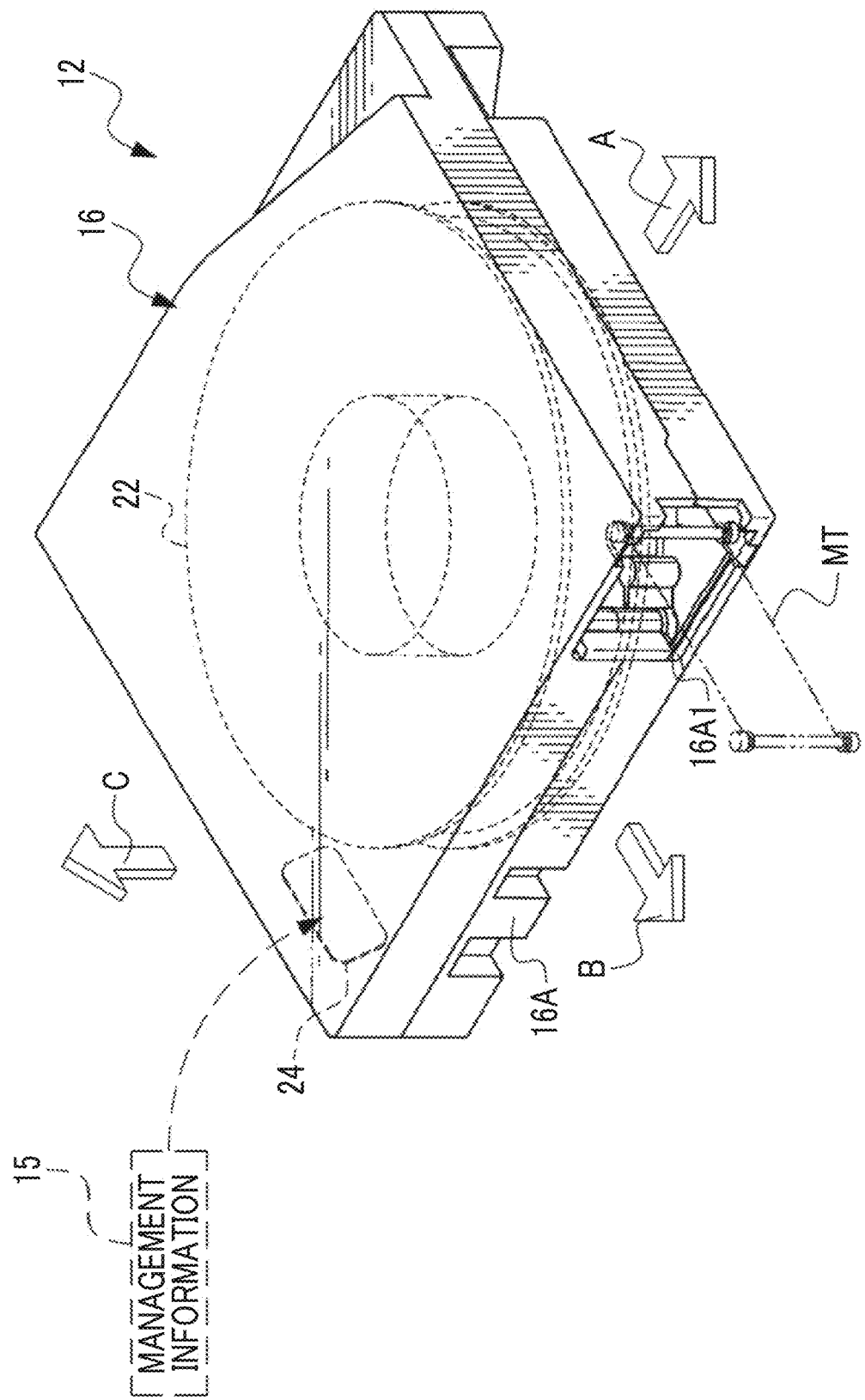
FIG. 2 is a schematic perspective view showing an example of an appearance of a magnetic tape cartridge.

As shown in FIG. 2 as an example, the magnetic tape cartridge 12 has a substantially rectangular shape in a plan view and comprises a box-like case 16. The magnetic tape MT is accommodated in the case 16.

A feeding reel 22 is rotatably accommodated inside the case 16. The magnetic tape MT is wound around the feeding reel 22. An opening 16A1 is formed on the front side of a right wall 16A of the case 16. The magnetic tape MT is extracted from the opening 16A1.

In the case 16, a cartridge memory 24 is accommodated as a storage medium other than the magnetic tape MT. An IC chip having an NVM is mounted in the cartridge memory 24. In the present embodiment, a so-called passive type RFID tag is employed as the cartridge memory 24, and reading and writing of various kinds of information (that is, acquisition and storage of the various kinds of information) are performed with respect to the cartridge memory 24 in a noncontact manner.

In the cartridge memory 24, management information 15 for managing the magnetic tape cartridge 12 is stored. The management information 15 includes, for example, information regarding the cartridge memory 24, information regarding the magnetic tape MT, information regarding the magnetic tape drive 14, and the like. In the present embodiment, the cartridge memory 24 is an example of a "noncontact communication medium" according to the present disclosure, and the management information 15 is an example of "information" according to the present disclosure.

Figure 3:
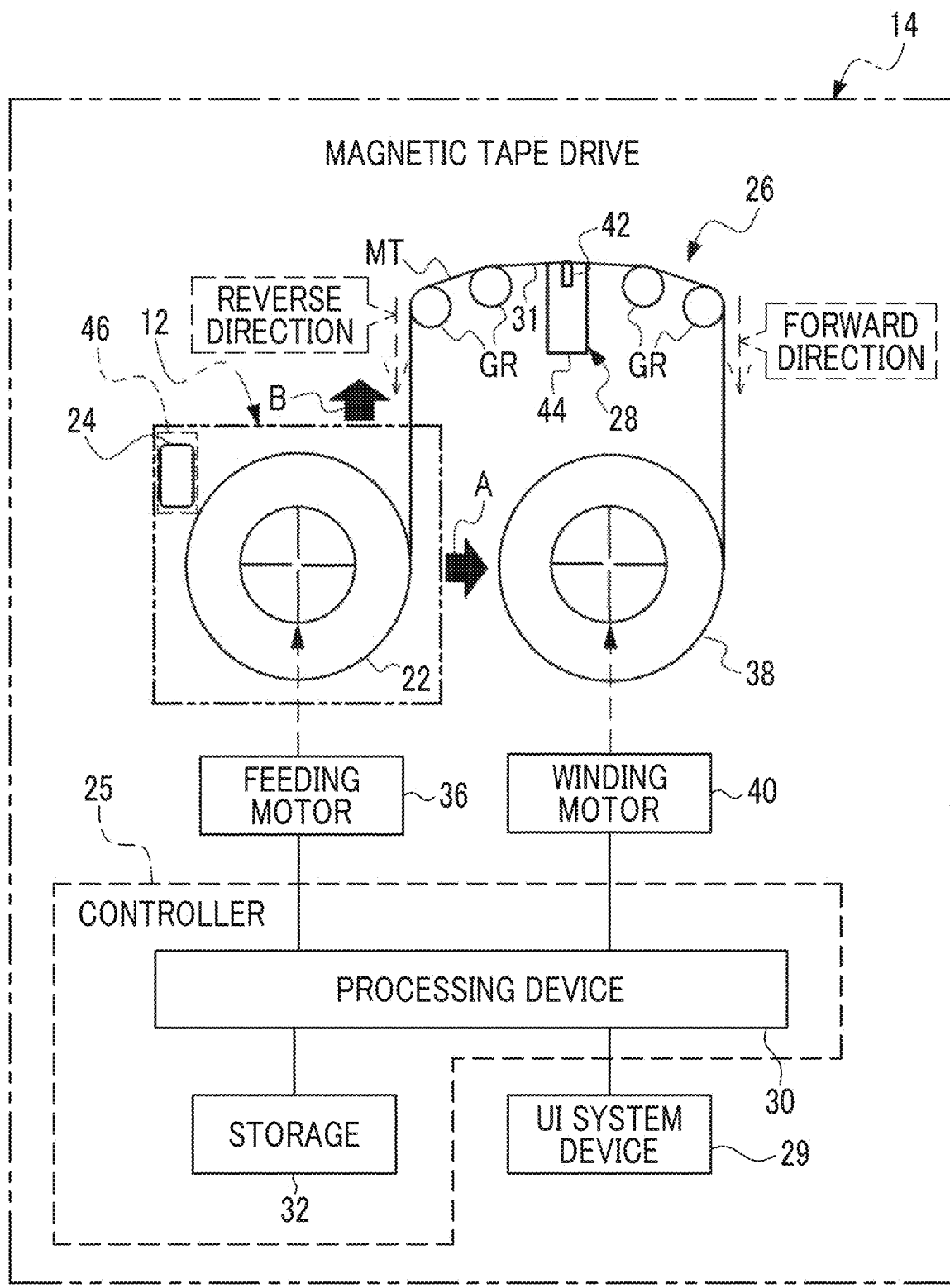
FIG. 3 is a schematic configuration diagram showing an example of a hardware configuration of a magnetic tape drive.

As shown in FIG. 3 as an example, the magnetic tape drive 14 comprises a controller 25, a conveying device 26, a magnetic head 28, and a UI system device 29. The controller 25 comprises a processing device 30 and a storage 32.

The magnetic tape drive 14 is loaded into the magnetic tape cartridge 12 along the direction of the arrow A. In the magnetic tape drive 14, the magnetic tape MT is extracted from the magnetic tape cartridge 12 and used. The magnetic tape drive 14 uses the management information 15 or the like stored in the cartridge memory 24 to control each unit provided in the magnetic tape cartridge 12 and the magnetic tape drive 14.

The magnetic tape drive 14 performs magnetic processing on a surface 31 of the magnetic tape MT by using the magnetic head 28 in a state in which the magnetic tape MT is running. The surface 31 is a recording surface where data is recorded. The magnetic processing indicates a recording process in which the magnetic head 28 records data on the surface 31 of the magnetic tape MT and a reproduction process in which the magnetic head 28 reproduces data from the surface 31 of the magnetic tape MT. The magnetic tape drive 14 selectively performs the recording process and the reproduction process by using the magnetic head 28. That is, the magnetic tape drive 14 extracts the magnetic tape MT from the magnetic tape cartridge 12, and records data on the surface 31 of the extracted magnetic tape MT by using the magnetic head 28 or reproduces data from the surface 31 of the extracted magnetic tape MT by using the magnetic head 28.

The processing device 30 controls entirety of the magnetic tape drive 14. In the present embodiment, the processing device 30 is implemented by an ASIC. It should be noted that the present disclosure is not limited to this. For example, the processing device 30 may be implemented by an FPGA and/or a PLD. In addition, the processing device 30 may be implemented by a computer including a CPU, a flash memory (for example, an EEPROM and/or an SSD), and a RAM. Additionally, the processing device 30 may also be implemented by a combination of two or more of an ASIC, an FPGA, a PLD, and a computer (that is, a computer including a processor that executes a program). That is, the processing device 30 may be implemented by a combination of a hardware configuration and a software configuration.

The storage 32 is connected to the processing device 30, and the processing device 30 performs writing of various kinds of information to the storage 32 and reading of various kinds of information from the storage 32. An example of the storage 32 includes a flash memory and/or an HDD. The flash memory and the HDD are merely examples, and any memory may be used as long as the memory is a non-volatile memory that can be mounted in the magnetic tape drive 14.

The UI system device 29 is a device having an acceptance function of accepting an instruction signal indicating an instruction from a user, and a presentation function of presenting information to the user. The acceptance function is implemented by, for example, a touch panel, a hard key (for example, a keyboard), and/or a mouse. The presentation function is implemented by, for example, a display, a printer, and/or a speaker. The UI system device 29 is connected to the processing device 30. The processing device 30 acquires the instruction signal accepted by the UI system device 29. The UI system device 29 presents various kinds of information to the user, under the control of the processing device 30.

The conveying device 26 is a device that selectively conveys the magnetic tape MT along a predetermined path in a forward direction and a reverse direction, and comprises a feeding motor 36, a winding reel 38, a winding motor 40, and a plurality of guide rollers GR. Here, the forward direction indicates a feeding direction of the magnetic tape MT, and the reverse direction indicates a rewinding direction of the magnetic tape MT.

The feeding motor 36 rotates the feeding reel 22 provided in the magnetic tape cartridge 12, under the control of the processing device 30. The processing device 30 controls the feeding motor 36 to control a rotation direction, a rotation speed, a rotation torque, and the like of the feeding reel 22.

The winding motor 40 rotates the winding reel 38, under the control of the processing device 30. The processing device 30 controls the winding motor 40 to control a rotation direction, a rotation speed, a rotation torque, and the like of the winding reel 38.

In a case in which the magnetic tape MT is to be wound onto the winding reel 38, the processing device 30 rotates the feeding motor 36 and the winding motor 40 such that the magnetic tape MT runs along the predetermined path in the forward direction. The rotation speeds, the rotation torques, and the like of the feeding motor 36 and the winding motor 40 are adjusted according to a speed at which the magnetic tape MT is wound onto the winding reel 38. In addition, by adjusting the rotation speed, the rotation torque, and the like of each of the feeding motor 36 and the winding motor 40 through the processing device 30, tension is applied to the magnetic tape MT. Additionally, the tension applied to the magnetic tape MT is controlled by adjusting the rotation speed, the rotation torque, and the like of each of the feeding motor 36 and the winding motor 40 through the processing device 30.

In a case in which the magnetic tape MT is to be rewound onto the feeding reel 22, the processing device 30 rotates the feeding motor 36 and the winding motor 40 such that the magnetic tape MT runs along the predetermined path in the reverse direction.

The plurality of guide rollers GR are each a roller that guides the magnetic tape MT. The predetermined path, that is, a running path of the magnetic tape MT, is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the running magnetic tape MT. The magnetic element unit 42 includes a plurality of magnetic elements.

The magnetic element unit 42 records data onto the magnetic tape MT conveyed by the conveying device 26 or reproduces data from the magnetic tape MT conveyed by the conveying device 26.

The magnetic tape drive 14 comprises a reader/writer 46. The reader/writer 46 is disposed on the lower side of the magnetic tape cartridge 12 in a state in which the magnetic tape cartridge 12 is loaded, so as to directly face a back surface of the cartridge memory 24, and performs communication with the cartridge memory 24 (for example, reading and writing of information with respect to the cartridge memory 24) in a noncontact manner. In the present embodiment, the reader/writer 46 is an example of an "external device" according to the present disclosure.

Figure 4:
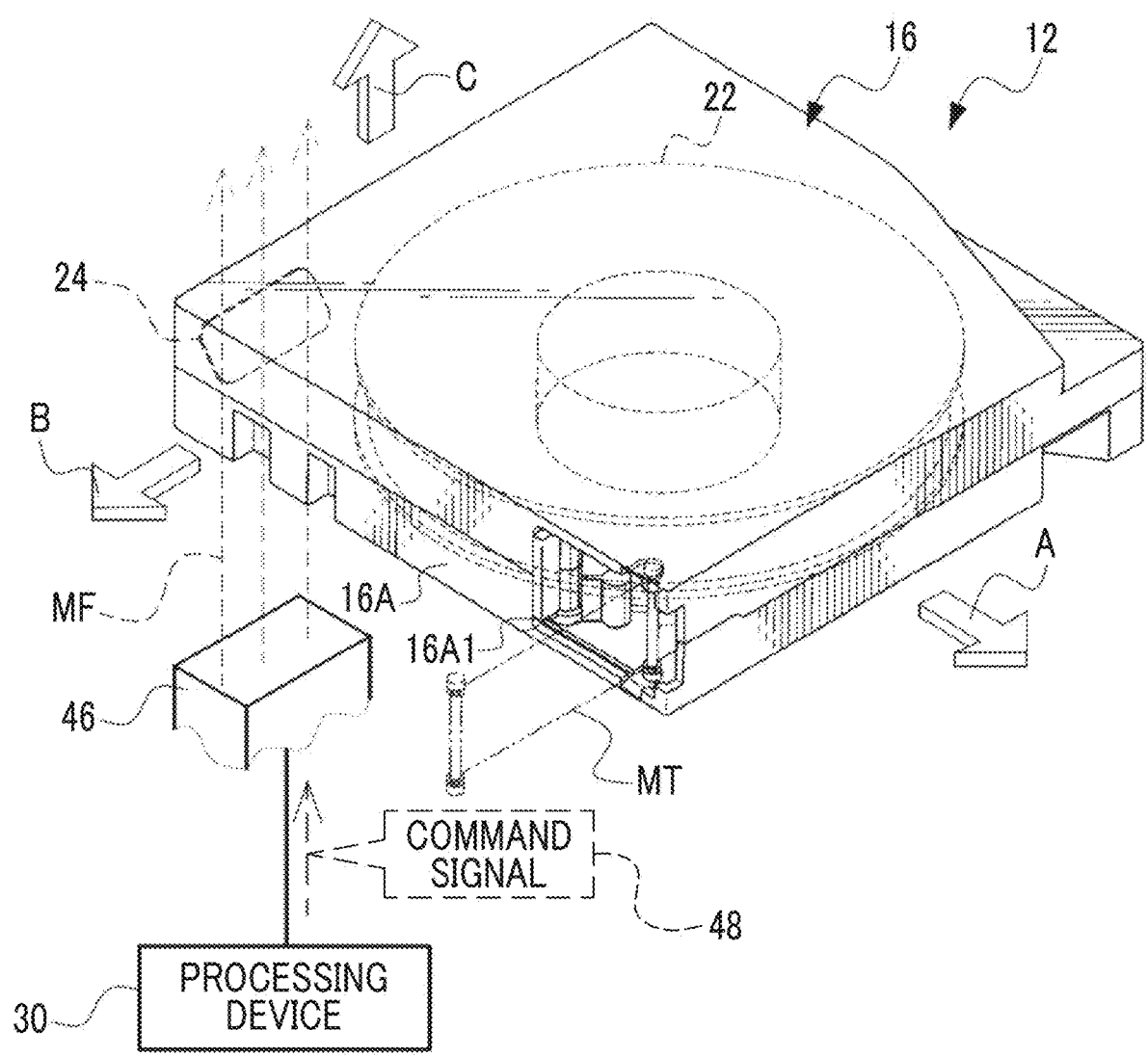
FIG. 4 is a schematic perspective view showing an example of an aspect in which a magnetic field is released by a reader/writer from a lower side of the magnetic tape cartridge.

As shown in FIG. 4 as an example, the reader/writer 46 is connected to the processing device 30. The processing device 30 outputs a command signal 48 to the reader/writer 46. The command signal 48 is a signal indicating a command for the cartridge memory 24. The reader/writer 46 generates a magnetic field MF in accordance with the command signal 48 input from the processing device 30 and releases the magnetic field MF from the lower side of the magnetic tape cartridge 12 toward the cartridge memory 24. The magnetic field MF released from the reader/writer 46 penetrates through the cartridge memory 24. In the present embodiment, the command signal 48 is an example of a "command signal" according to the present disclosure, and the magnetic field MF is an example of a "magnetic field" according to the present disclosure.

The reader/writer 46 spatially transfers the command signal 48 to the cartridge memory 24, under the control of the processing device 30. In a case in which the command signal is spatially transferred from the reader/writer 46 to the cartridge memory 24, the command signal 48 is included in the magnetic field MF by the reader/writer 46 in accordance with an instruction from the processing device 30. In other words, the command signal 48 is superimposed on the magnetic field MF. That is, the reader/writer 46 transmits the command signal 48 to the cartridge memory 24 via the magnetic field MF, under the control of the processing device 30.

The reader/writer 46 performs communication with the cartridge memory 24 via the magnetic field MF in a noncontact manner, thereby causing the cartridge memory 24 to perform processing corresponding to the command signal 48. For example, the reader/writer 46 transmits the command signal 48 to the cartridge memory 24, thereby causing the cartridge memory 24 to perform processing including, for example, a writing process and/or a reading process. The writing process indicates, for example, processing of writing information determined according to the command signal 48, within the management information 15 (refer to FIG. 2), into a storage region in the cartridge memory 24. The reading process indicates, for example, processing of reading information determined according to the command signal 48, within the management information 15 stored in the storage region in the cartridge memory 24, from the storage region.

The processing device 30 performs communication with the cartridge memory 24 via the reader/writer 46 in a noncontact manner to write the management information 15 into the cartridge memory 24 or to read the management information 15 from the cartridge memory 24.

Figure 5:
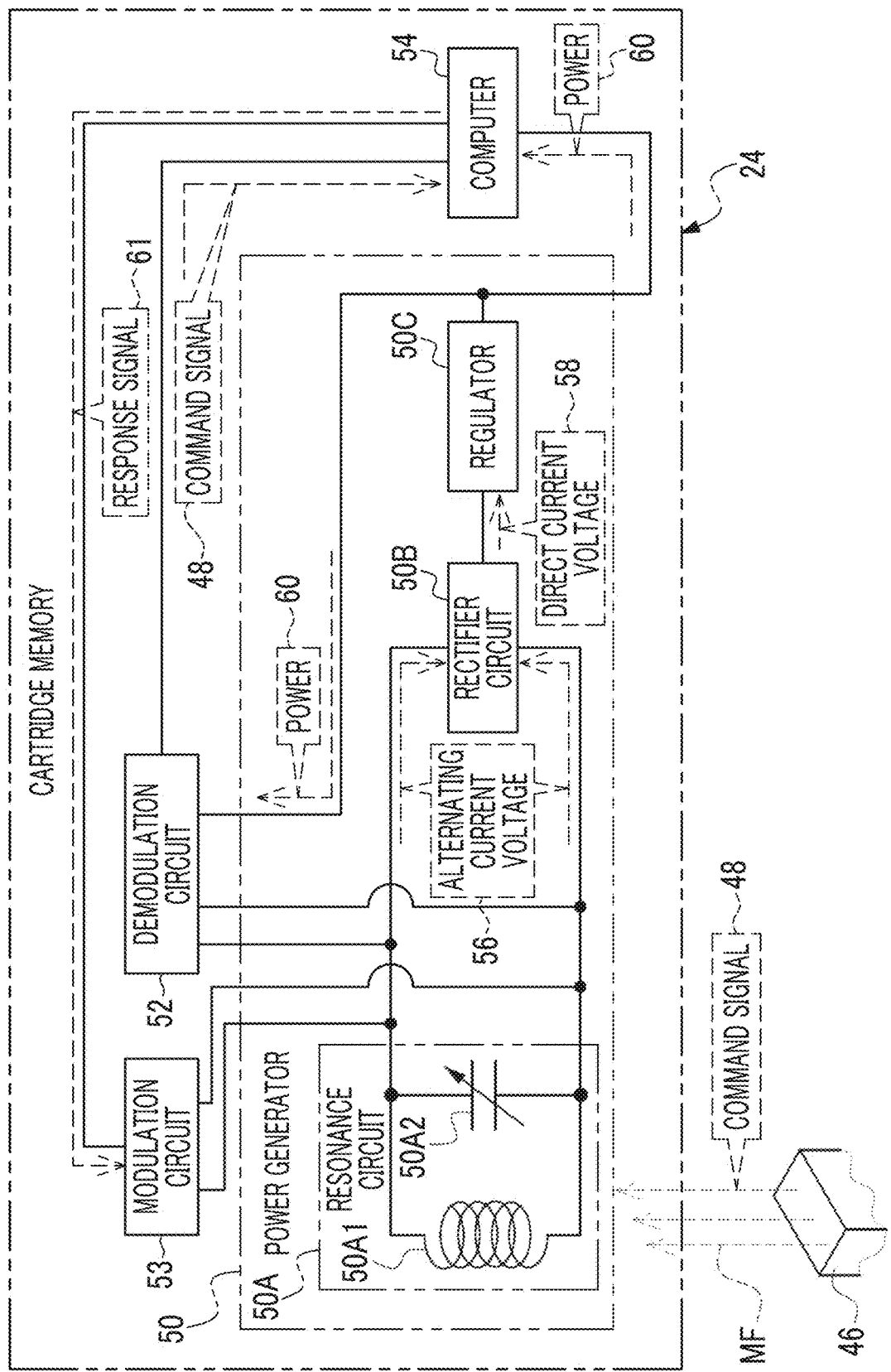
FIG. 5 is a conceptual diagram showing an example of a hardware configuration of an electrical system of a cartridge memory mounted in the magnetic tape cartridge.

As shown in FIG. 5 as an example, the cartridge memory 24 comprises a power generator 50, a demodulation circuit 52, a modulation circuit 53, and a computer 54. The power generator 50 includes a resonance circuit 50A, a rectifier circuit 50B, and a regulator 50C. The resonance circuit 50A includes an antenna coil 50A1 and a variable capacitor 50A2. The variable capacitor 50A2 is connected in parallel to the antenna coil 50A1. In the example shown in FIG. 5, the single variable capacitor 50A2 is connected in parallel to the antenna coil 50A1. In addition, the antenna coil 50A1 and the variable capacitor 50A2 are connected in parallel to the demodulation circuit 52 and are also connected in parallel to the rectifier circuit 50B.

In the present embodiment, the resonance circuit 50A is an example of a "resonance circuit" according to the present disclosure, and the antenna coil 50A1 is an example of an "antenna coil" according to the present disclosure.

The power generator 50 generates power 60 by the magnetic field MF, which is provided from the reader/writer 46 (refer to FIGS. 3 and 4), acting on the antenna coil 50A1. The power 60 is operating power for operating various circuits (for example, the computer 54, the demodulation circuit 52, and the like) provided in the cartridge memory 24. The power 60 is an example of "operating power" according to the present disclosure.

In order to achieve the generation of the power 60, the resonance circuit 50A generates an alternating current voltage 56 by resonating (that is, generating a resonance phenomenon) using an induced current induced in the antenna coil 50A1 by the magnetic field MF acting on the antenna coil 50A1. The resonance circuit 50A outputs the alternating current voltage 56 to the rectifier circuit 50B.

The rectifier circuit 50B generates a direct current voltage 58 by rectifying the alternating current voltage 56 input from the resonance circuit 50A. The rectifier circuit 50B is connected to the regulator 50C and outputs the direct current voltage 58 to the regulator 50C.

The regulator 50C is connected to various circuits (in the example shown in FIG. 5, the demodulation circuit 52, the computer 54, and the like) provided in the cartridge memory 24. The regulator 50C generates the power 60 based on the direct current voltage 58 input from the rectifier circuit 50B (for example, direct current power obtained by regulating the direct current voltage 58 to a predetermined voltage value) and supplies the power 60 to the various circuits provided in the cartridge memory 24, thereby operating the various circuits provided in the cartridge memory 24. In the present embodiment, the regulator 50C is an example of a "regulator" according to the present disclosure.

The demodulation circuit 52 is connected to the resonance circuit 50A. The demodulation circuit 52 extracts and demodulates the command signal 48 from the magnetic field MF received by the antenna coil 50A1 and outputs the demodulated command signal 48 to the computer 54.

The computer 54 generates a response signal 61 for the command signal 48 input from the demodulation circuit 52 and outputs the response signal 61 to the modulation circuit 53. That is, the computer 54 executes processing corresponding to the command signal 48 input from the demodulation circuit 52 and outputs the response signal 61 indicating a processing result to the modulation circuit 53. The modulation circuit 53 modulates the response signal 61 input from the computer and outputs the modulated response signal 61 to the resonance circuit 50A. The resonance circuit 50A transmits the response signal 61 modulated by the modulation circuit 53 to the reader/writer 46 via the magnetic field MF. That is, in a case in which the response signal 61 is transmitted from the cartridge memory 24 to the reader/writer 46, the response signal 61 is included in the magnetic field MF. In other words, the response signal 61 is superimposed on the magnetic field MF. In the present embodiment, the command signal 48 is an example of a "command signal" according to the present disclosure, and the response signal 61 is an example of a "response signal" according to the present disclosure.

Figure 6:
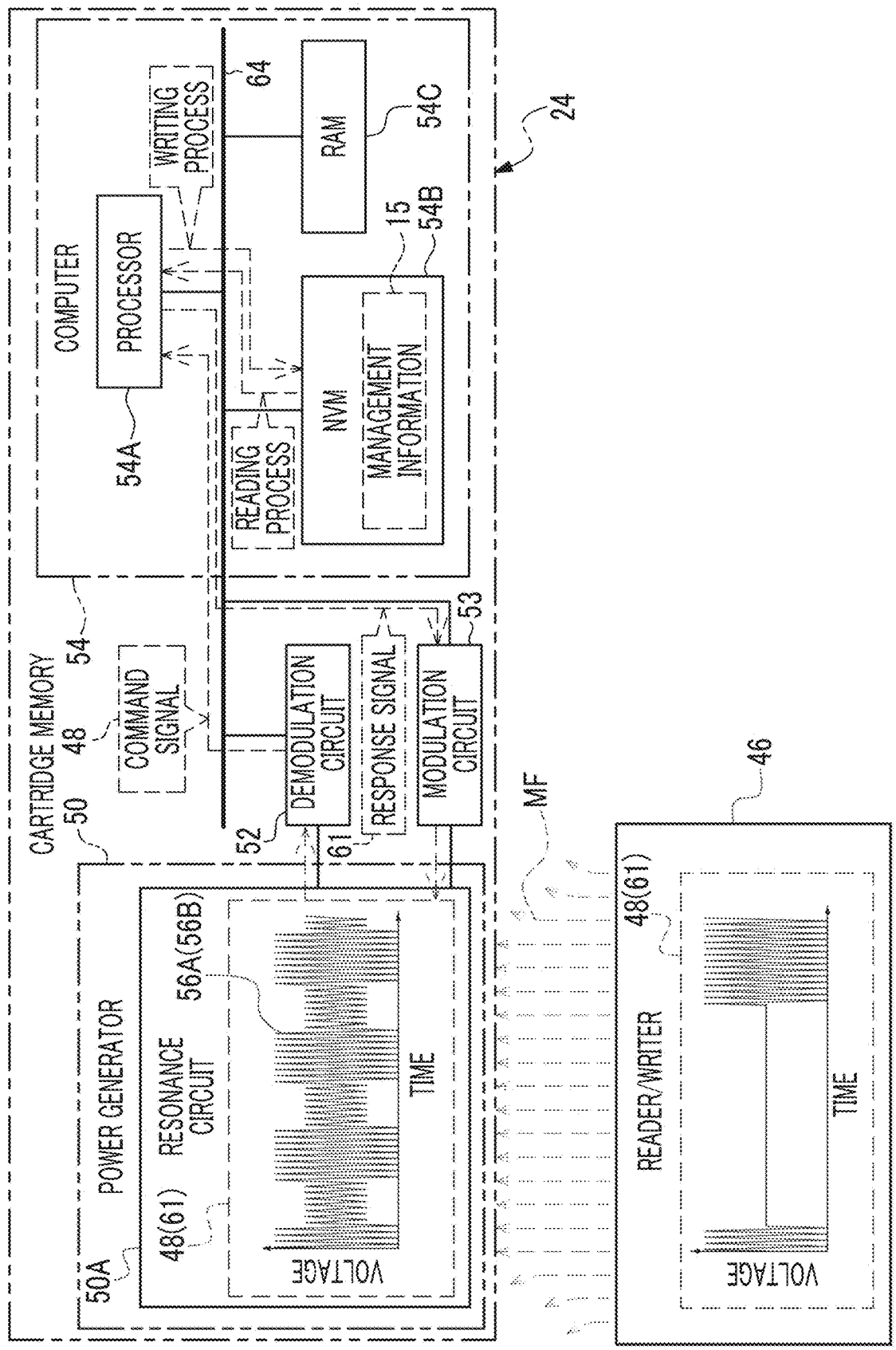
FIG. 6 is a conceptual diagram showing a configuration example of various circuits provided in the cartridge memory and waveform examples of a command signal and a response signal.

The computer 54 controls entirety of the cartridge memory 24. As shown in FIG. 6 as an example, the computer 54 comprises a processor 54A, an NVM 54B, and a RAM 54C. The processor 54A is, for example, a CPU. The NVM 54B is, for example, a non-volatile memory, such as an EEPROM and/or a ferroelectric memory. The RAM 54C is a volatile memory, such as a DRAM, and is used as a work memory by the processor 54A. The processor 54A, the NVM 54B, and the RAM 54C are connected to a bus 64. In addition, the demodulation circuit 52 is connected to the bus 64, and the command signal 48 is supplied from the demodulation circuit 52 to the processor 54A. Additionally, the modulation circuit 53 is connected to the bus 64, and the response signal 61 is supplied from the processor 54A to the modulation circuit 53. In the present embodiment, the processor 54A is an example of a "processing circuit" according to the present disclosure, and the NVM 54B is an example of a "memory" according to the present disclosure.

The processor 54A selectively executes a writing process and a reading process on the NVM 54B, as the processing corresponding to the command signal 48. That is, the writing process is performed by the processor 54A so that information determined according to the command signal 48 is written into the NVM 54B, and the reading process is performed by the processor 54A so that information determined according to the command signal 48, within information stored in the NVM 54B, is read from the NVM 54B. In the example shown in FIG. 6, an aspect example is shown in which the management information 15 is stored in the NVM 54B, and the processor 54A writes the management information 15 into the NVM 54B or reads the management information 15 from the NVM 54B, according to the command signal 48.

The command signal 48 is a waveform signal and is transmitted to the cartridge memory 24 by the reader/writer 46 via the magnetic field MF. The resonance circuit 50A resonates upon receiving the magnetic field MF transmitted from the reader/writer 46 to generate an alternating current voltage 56A indicating the command signal 48. The alternating current voltage 56A is included in the concept of the alternating current voltage 56 shown in FIG. 5. The demodulation circuit 52 extracts and demodulates the command signal 48 from the resonance circuit 50A and outputs the demodulated command signal 48 (for example, a binarized signal) to the processor 54A.

The processor 54A executes the processing corresponding to the command signal 48 input from the demodulation circuit 52. In addition, the processor 54A outputs the processing result to the modulation circuit 53 as the response signal 61, which is a waveform signal (for example, a binarized signal). The modulation circuit 53 modulates the response signal 61 input from the processor 54A and supplies the modulated response signal 61 to the resonance circuit 50A. The resonance circuit 50A generates an alternating current voltage 56B indicating the response signal 61 input from the modulation circuit 53. The alternating current voltage 56B is included in the concept of the alternating current voltage 56 shown in FIG. 5. The resonance circuit 50A transmits the response signal 61 modulated by the modulation circuit 53 to the reader/writer 46 via the magnetic field MF.

As described above, the noncontact communication between the cartridge memory 24 and the reader/writer 46 is achieved by the command signal 48 and the response signal 61 being spatially transferred via the magnetic field MF.

Meanwhile, in order to stabilize the noncontact communication between the cartridge memory 24 and the reader/writer 46, it is desirable that the waveforms of the command signal 48 and the response signal 61 are waveforms without distortion conforming to a communication method (for example, a method conforming to a known standard such as ISO14443 or ISO18092, or a method conforming to the LTO specification of ECMA319). In a case in which the waveforms of the command signal 48 and the response signal 61 are waveforms without distortion, the processor 54A can accurately specify the content of the command signal 48, and the reader/writer 46 can accurately specify the content of the response signal 61.

Figure 7:
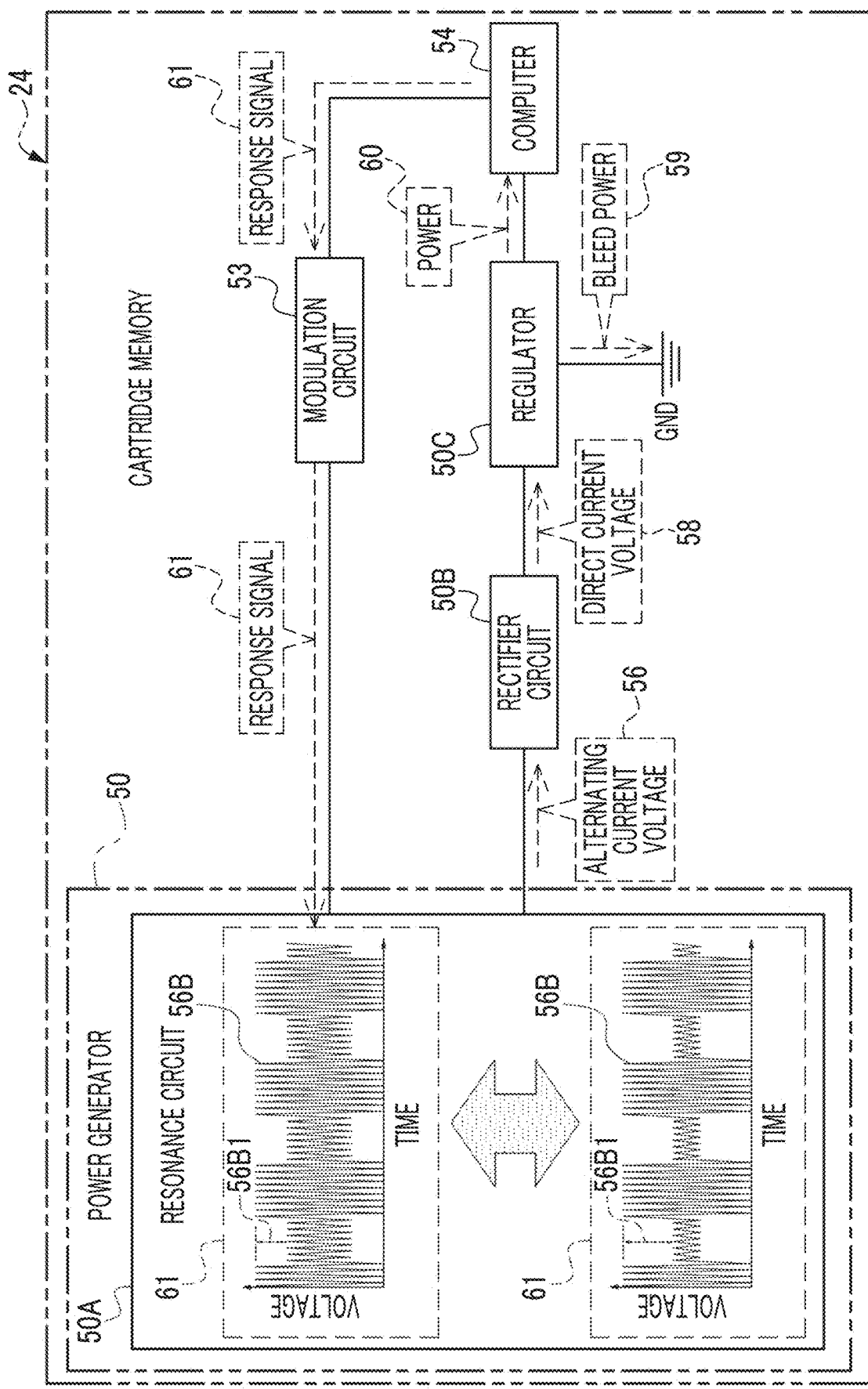
FIG. 7 is a conceptual diagram showing an example of a signal in which the response signal is encoded with different modulation depths.

Since the cartridge memory 24 is a passive type noncontact communication medium that does not include a battery, it is necessary to generate the power 60 by using the magnetic field MF from the reader/writer 46 and to supply the power 60 to the various circuits such as the computer 54. Here, the shorter the distance between the cartridge memory 24 and the reader/writer 46 is, the more the excessive alternating current voltage 56 is generated by the resonance circuit 50A. Accordingly, in a case in which the excessive direct current voltage 58 is supplied from the rectifier circuit 50B to the regulator 50C, the regulator 50C generates the excessive power 60. Therefore, as shown in FIG. 7 as an example, the regulator 50C is connected to a ground potential GND, and the generated excess power is dissipated to the ground potential GND as bleed power 59, allowing the adjusted power 60 to be supplied to the various circuits such as the computer 54.

Here, assuming that the resistance value of the modulation circuit 53 is constant, in a case in which the bleed power 59 is small, a current flowing to the modulation circuit 53 during the modulation of the modulation circuit 53 is not attracted to the regulator 50C and is increased, and conversely, in a case in which the bleed power 59 is large, the current flowing to the modulation circuit 53 during the modulation of the modulation circuit 53 is attracted to the regulator 50C and is decreased. Since the smaller the bleed power 59 is, the larger the current flowing to the ground potential GND through the modulation circuit 53 during the modulation is, the modulation depth of the response signal 61 (that is, a difference between the maximum amplitude of the response signal 61 and the minimum amplitude of the response signal 61) becomes deeper, and conversely, since the larger the bleed power 59 is, the smaller the current flowing to the ground potential GND through the modulation circuit 53 during the modulation of the response signal 61 is, the modulation depth of the response signal 61 becomes shallower. The modulation depth of the response signal 61 becomes shallower as the distance between the cartridge memory 24 and the reader/writer 46 decreases. In addition, the modulation depth of the response signal 61 may also become shallower depending on the specification of the antenna coil 50A1 and/or the specification of an antenna coil (not shown) mounted in the reader/writer 46. In this manner, in a case in which the modulation depth of the response signal 61 becomes shallower, it is difficult for the reader/writer 46 to read the content of the response signal 61 acquired from the cartridge memory 24 via the magnetic field MF. For example, as the modulation depth of the response signal 61 becomes shallower, the reader/writer 46 may become more susceptible to misinterpretation in a case in which noise is mixed in the response signal 61.

On the other hand, the modulation depth of the response signal 61 becomes deeper as the distance between the cartridge memory 24 and the reader/writer 46 increases. As the modulation depth of the response signal 61 becomes deeper, a modulation depth 56B1 of the alternating current voltage 56B (that is, a difference between the maximum amplitude of the alternating current voltage 56B and the minimum amplitude of the alternating current voltage 56B) becomes deeper. In addition, the modulation depth of the response signal 61 may also become deeper depending on the specification of the antenna coil 50A1 and/or the specification of the antenna coil (not shown) mounted in the reader/writer 46. As the modulation depth 56B1 of the alternating current voltage 56B becomes deeper, the direct current voltage 58 to be generated by the rectifier circuit 50B is decreased, and the power 60 to be generated by the regulator 50C may be insufficient. For example, in a case in which the modulation depth 56B1 of the alternating current voltage 56B is too deep, a power outage may occur in the cartridge memory 24. That is, in a case in which the modulation depth 56B1 of the alternating current voltage 56B is too deep, the direct current voltage 58 to be generated by the rectifier circuit 50B is zero, and the supply of the power 60 to the various circuits of the cartridge memory 24 may be interrupted while the direct current voltage 58 is zero.

Figure 8:
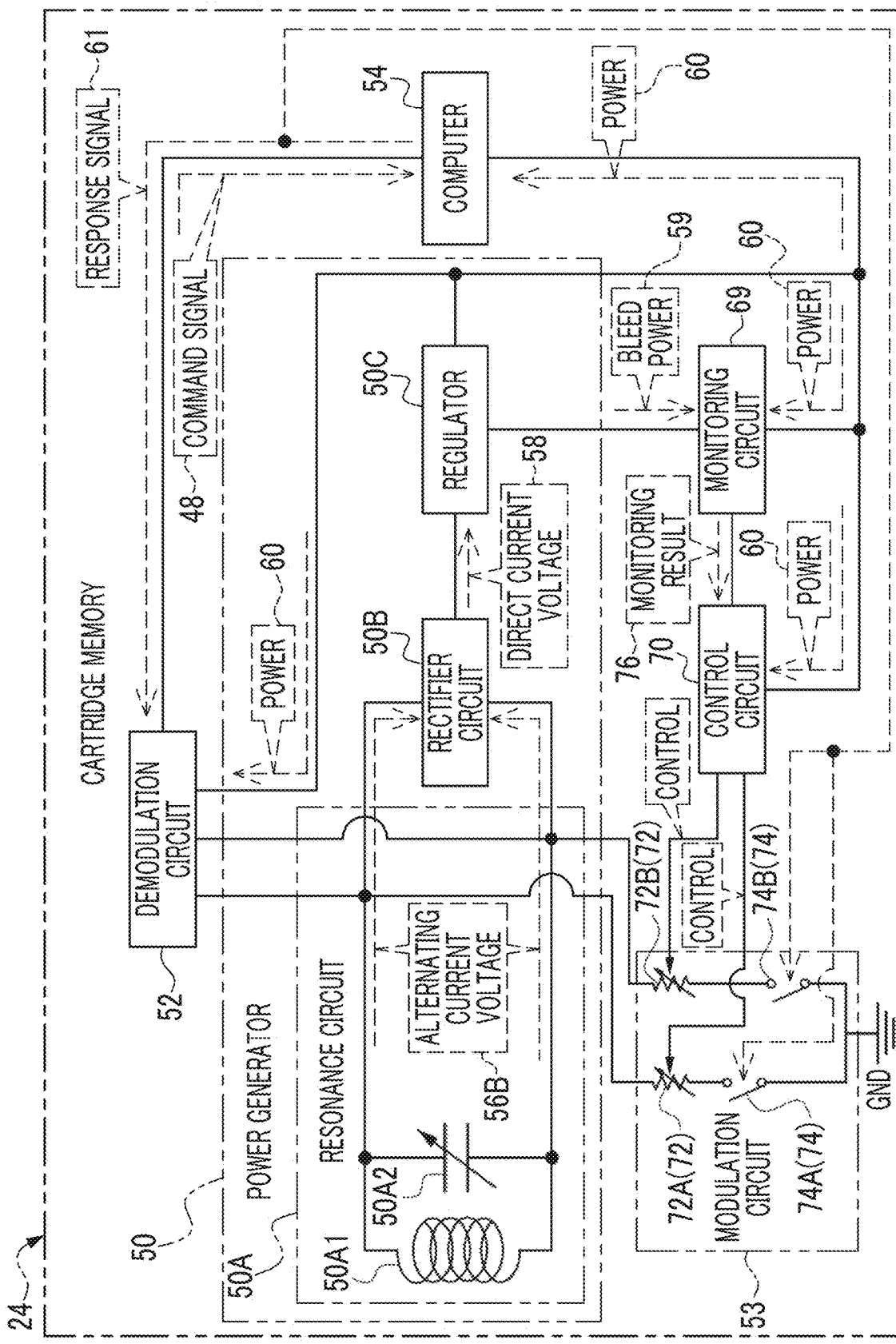
FIG. 8 is a conceptual diagram showing an example of a detailed hardware configuration of the electrical system of the cartridge memory shown in FIG. 5.

In that respect, in view of such circumstances, in the present embodiment, as shown in FIG. 8 as an example, the cartridge memory 24 comprises the modulation circuit 53, a monitoring circuit 69, and a control circuit 70. The modulation circuit 53 is a circuit that modulates the alternating current voltage 56B. The monitoring circuit 69 is a circuit that monitors the bleed power 59 dissipated from the regulator 50C. The control circuit 70 is a circuit that controls the modulation circuit 53 based on a monitoring result 76 by the monitoring circuit 69.

The monitoring circuit 69 and the control circuit 70 are implemented by ASICs. It should be noted that this is merely an example, and the monitoring circuit 69 and/or the control circuit 70 may be implemented by an FPGA and/or a PLD. In addition, the monitoring circuit 69 and/or the control circuit 70 may be implemented by a computer including a CPU, an NVM, and a RAM. Additionally, the monitoring circuit 69 and/or the control circuit 70 may be implemented by combining two or more of an ASIC, an FPGA, a PLD, and a computer. That is, the monitoring circuit 69 and/or the control circuit 70 may be implemented by a combination of a hardware configuration and a software configuration.

The modulation circuit 53 includes a variable resistor 72 and a switcher 74. Here, the variable resistor 72 is an example of a "variable resistor" according to the present disclosure, and the switcher 74 is an example of a "switcher" according to the present disclosure.

The variable resistor 72 is connected to the resonance circuit 50A. The variable resistor 72 includes variable resistance elements 72A and 72B. The variable resistance elements 72A and 72B are examples of a "pair of variable resistance elements" according to the present disclosure. The variable resistance elements 72A and 72B are connected in parallel to the resonance circuit 50A. In the example shown in FIG. 8, one end of the variable resistance element 72A is connected to one end of the antenna coil 50A1 and one end of the variable capacitor 50A2, and one end of the variable resistance element 72B is connected to the other end of the antenna coil 50A1 and the other end of the variable capacitor 50A2.

The switcher 74 switches between an applied state in which a load (in other words, a resistance value) of the variable resistor 72 is applied to the resonance circuit 50A (hereinafter, also simply referred to as an "applied state") and a non-applied state in which the load of the variable resistor 72 is not applied to the resonance circuit 50A (hereinafter, also simply referred to as a "non-applied state"), according to the response signal 61. The switcher 74 corresponds to the variable resistance elements 72A and 72B and is a pair of switches capable of connecting the variable resistance elements 72A and 72B and the ground potential GND to each other. In the example shown in FIG. 8, switches 74A and 74B are shown as examples of the pair of switches. The switches 74A and 74B are examples of a "pair of switches" according to the present disclosure.

One end of the switch 74A is connected to the other end of the variable resistance element 72A, and the other end of the switch 74A is connected to the ground potential GND. One end of the switch 74B is connected to the other end of the variable resistance element 72B, and the other end of the switch 74B is connected to the ground potential GND.

The switch 74A switches between a first connection state in which the variable resistance element 72A and the ground potential GND are connected to each other and a first disconnection state in which the variable resistance element 72A and the ground potential GND are not connected to each other, under the control of the computer 54. In the example shown in FIG. 8, the response signal 61 is a signal indicating "0" or "1", and the switch 74A switches between the first connection state and the first disconnection state according to the response signal 61. For example, the switch 74A is in the first connection state in a case in which the response signal 61 is a signal indicating "0", and is in the first disconnection state in a case in which the response signal 61 is a signal indicating "1". It should be noted that this switching example is merely an example, and for example, the switch 74A may be in the first connection state in a case in which the response signal 61 is the signal indicating "1", and may be in the first disconnection state in a case in which the response signal 61 is the signal indicating "0".

The switch 74B switches between a second connection state in which the variable resistance element 72B and the ground potential GND are connected to each other and a second disconnection state in which the variable resistance element 72B and the ground potential GND are not connected to each other, under the control of the computer 54. In the example shown in FIG. 8, the switch 74B switches between the second connection state and the second disconnection state according to the response signal 61. For example, the switch 74B is in the second connection state in a case in which the response signal 61 is a signal indicating "0", and is in the second disconnection state in a case in which the response signal 61 is a signal indicating "1". It should be noted that this switching example is merely an example, and for example, the switch 74B may be in the second connection state in a case in which the response signal 61 is the signal indicating "1", and may be in the second disconnection state in a case in which the response signal 61 is the signal indicating "0".

The first connection state is achieved by turning on the switch 74A, and the first disconnection state is achieved by turning off the switch 74A. In addition, the second connection state is achieved by turning on the switch 74B, and the second disconnection state is achieved by turning off the switch 74B. The switches 74A and 74B are switched on and off according to the response signal 61. For example, in a case in which the response signal 61 is the signal indicating "0", the switches 74A and 74B are turned on, and in a case in which the response signal 61 is the signal indicating "1", the switches 74A and 74B are turned off. In a case in which the switches 74A and 74B are turned on, the resonance circuit 50A is connected to the ground potential GND via the variable resistor 72, so that a part of the power of the resonance circuit 50A flows to the ground potential GND. In a case in which the switches 74A and 74B are turned on to connect the variable resistor 72 to the ground potential GND, the loads of the variable resistance elements 72A and 72B are applied to the resonance circuit 50A. In addition, the state in which the load is applied to the resonance circuit 50A is released by turning off the switches 74A and 74B. That is, the applied state is achieved in a case in which the switches 74A and 74B are turned on according to the response signal 61, and the non-applied state is achieved in a case in which the switches 74A and 74B are turned off according to the response signal 61.

The monitoring circuit 69 monitors the bleed power 59 dissipated from the regulator 50C in order to generate the power 60 and outputs the monitoring result 76 to the control circuit 70. The control circuit 70 controls the resistance value of the variable resistor 72 (that is, the resistance values of the variable resistance elements 72A and 72B) according to the monitoring result 76 input from the monitoring circuit 69. For example, the control circuit 70 reduces, in a case in which the bleed power 59 is increased, the resistance value of the variable resistor 72 in accordance with the increase in the bleed power 59, and the control circuit 70 increases, in a case in which the bleed power 59 is decreased, the resistance value of the variable resistor 72 in accordance with the decrease in the bleed power. By changing the resistance value of the variable resistor 72, the load of the variable resistor 72 to be applied to the resonance circuit 50A is changed. The load of the variable resistor 72 to be applied to the resonance circuit 50A is changed according to the bleed power 59, thereby adjusting the modulation depth of the alternating current voltage 56B.

Here, the modulation of the alternating current voltage 56B indicates, for example, varying a height difference of the waveform of the alternating current voltage 56B. Varying the height difference of the waveform of the alternating current voltage 56B indicates, for example, changing the amplitude of the alternating current voltage 56B to reduce or increase a difference between the maximum amplitude and the minimum amplitude of the alternating current voltage 56B (that is, to shallow or deepen the modulation depth 56B1 of the alternating current voltage 56B). The amplitude of the alternating current voltage 56B is changed by applying the load of the variable resistor 72 to the resonance circuit 50A and controlling the load. For example, in a case in which the load of the variable resistor 72 to be applied to the resonance circuit 50A is changed, the amplitude of the alternating current voltage 56B is changed accordingly (that is, the height difference of the waveform of the alternating current voltage 56B varies). By changing the amplitude of the alternating current voltage 56B, the magnitude of the direct current voltage 58 to be generated by the rectifier circuit 50B is also changed. As a result, the regulator 50C generates the optimal power 60 to maintain a constant modulation depth (in other words, a modulation degree) of the response signal 61 (that is, the power 60 that enables stable supply of the power 60 to the various circuits such as the computer 54 and that enables the reader/writer 46 to accurately read the content of the response signal 61).

Next, actions of parts of the magnetic tape system 10 according to the present disclosure will be described with reference to FIG. 9. The flowchart shown in FIG. 9 is an example of an "operation method of a noncontact communication medium" according to the present disclosure.

Figure 9:
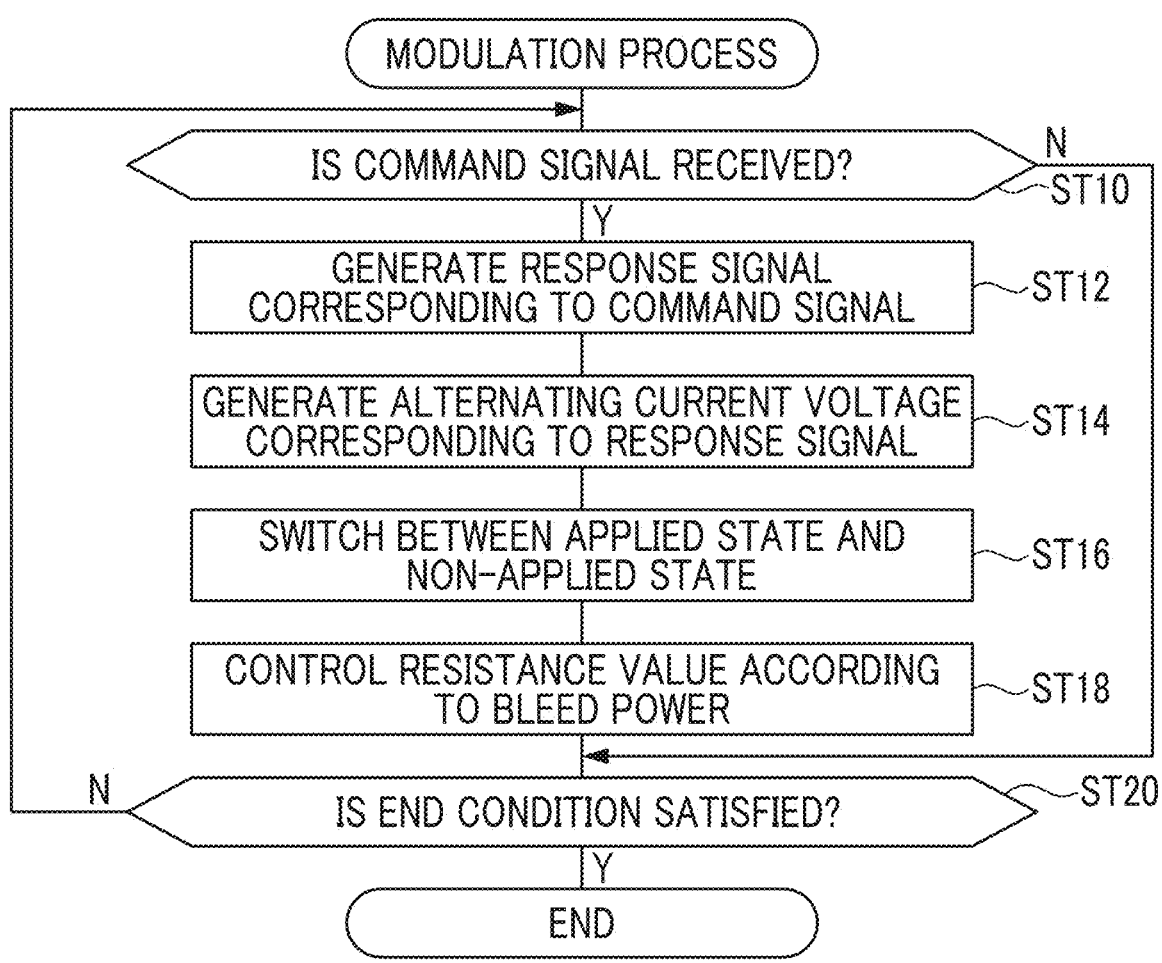
FIG. 9 is a flowchart showing an example of a flow of a modulation process executed by the cartridge memory.

In the modulation process shown in FIG. 9, first, in step ST10, the processor 54A determines whether or not the command signal 48 is received by the demodulation circuit 52. In step ST10, in a case in which the command signal 48 is not received by the demodulation circuit 52, a negative determination is made, and the modulation process transitions to step ST20. In step ST10, in a case in which the command signal 48 is received by the demodulation circuit 52, an affirmative determination is made, and the modulation process transitions to step ST12. In addition, in a case in which the command signal 48 is received by the demodulation circuit 52, the command signal 48 is demodulated by the demodulation circuit 52.

In step ST12, the processor 54A generates the response signal 61 corresponding to the command signal 48 demodulated by the demodulation circuit 52. After the processing of step ST12 is executed, the modulation process transitions to step ST14.

In step ST14, the resonance circuit 50A generates the alternating current voltage 56B corresponding to the response signal 61 generated by the processor 54A. After the processing of step ST14 is executed, the modulation process transitions to step ST16.

In step ST16, the switcher 74 switches between the applied state and the non-applied state according to the response signal 61 generated by the processor 54A. That is, the switches 74A and 74B are switched on and off according to the response signal 61, thereby switching between the applied state and the non-applied state. After the processing of step ST16 is executed, the modulation process transitions to step ST18.

In step ST18, the control circuit 70 controls the resistance value of the variable resistor 72 according to the bleed power 59. The resistance value of the variable resistor 72 is changed in a state in which the switches 74A and 74B are turned on, thereby changing the degree of modulation of the alternating current voltage 56B. That is, the modulation depth 56B1 of the alternating current voltage 56B is changed.

Here, the processing content of step ST18 will be described in more detail. The bleed power 59 is correlated with the modulation depth 56B1 of the alternating current voltage 56B, and the modulation depth 56B1 of the alternating current voltage 56B can be specified from the bleed power 59. As the modulation depth 56B1 of the alternating current voltage 56B becomes deeper in a range equal to or greater than a predetermined depth level, the direct current voltage 58 to be generated by the rectifier circuit 50B is decreased, and the power 60 to be generated by the regulator 50C may be insufficient. On the contrary, as the modulation depth 56B1 of the alternating current voltage 56B becomes shallower in a range of less than the predetermined depth level, the response signal 61 that is difficult for the reader/writer 46 to interpret may be transmitted from the cartridge memory 24 to the reader/writer 46.

In that respect, in this step ST18, the monitoring circuit 69 measures the bleed power 59, determines whether or not the measured bleed power 59 is equal to or greater than a certain level, and specifies how much greater the bleed power 59 is from the certain level in a case in which the measured bleed power 59 is equal to or greater than the certain level. In addition, the monitoring circuit 69 specifies how much smaller the bleed power 59 is from the certain level in a case in which the measured bleed power 59 is less than the certain level.

The bleed power 59 being equal to or greater than the certain level means that the direct current voltage 58 to be input to the regulator 50C is excessively large (in other words, it means that the modulation depth 56B1 of the alternating current voltage 56B is too shallow). Therefore, in this case, in this step ST18, the control circuit 70 reduces the resistance value of the variable resistor 72 such that the magnitude of the direct current voltage 58 to be input to the regulator 50C is optimized (that is, reduces the resistance value of the variable resistor 72 such that the magnitude of the direct current voltage 58 to be input to the regulator 50C reaches a predetermined voltage level). In addition, the bleed power 59 being less than the certain level means that the direct current voltage 58 to be input to the regulator 50C is excessively small (in other words, it means that the modulation depth 56B1 of the alternating current voltage 56B is too deep). Therefore, in this case, in this step ST18, the control circuit 70 increases the resistance value of the variable resistor 72 such that the magnitude of the direct current voltage 58 to be input to the regulator 50C is optimized (that is, increases the resistance value of the variable resistor 72 such that the magnitude of the direct current voltage 58 to be input to the regulator 50C reaches the predetermined voltage level). That is, the resistance value of the variable resistor 72 is controlled by the control circuit 70 such that the magnitude of the direct current voltage 58 to be input to the regulator 50C is maintained at the predetermined voltage level.

In this step ST18, the modulation depth 56B1 of the alternating current voltage 56B is changed by controlling the resistance value of the variable resistor 72. Here, the control amount of the resistance value of the variable resistor 72 by the control circuit 70 is determined according to the bleed power 59 measured by the monitoring circuit 69. This is because the bleed power 59 is correlated with the modulation depth 56B1 of the alternating current voltage 56B, and the bleed power 59 and the modulation depth 56B1 of the alternating current voltage 56B have a correspondence relationship. After the processing of step ST18 is executed, the modulation process transitions to step ST20.

In step ST20, the processor 54A determines whether or not a condition for ending the modulation process is satisfied. An example of the condition for ending the modulation process includes a condition in which a voltage value of the alternating current voltage 56B or a voltage value of the direct current voltage 58 remains at "zero" for a certain time or longer, or a condition in which a command to end the modulation process is provided from the reader/writer 46 as the command signal 48.

In step ST20, in a case in which the condition for ending the modulation process is not satisfied, a negative determination is made, and the modulation process transitions to step ST10. In step ST20, in a case in which the condition for ending the modulation process is satisfied, an affirmative determination is made, and the modulation process ends.

As described above, in the present embodiment, the switcher 74 switches between the applied state in which the load of the variable resistor 72 is applied to the resonance circuit 50A and the non-applied state in which the load of the variable resistor 72 is not applied to the resonance circuit 50A, according to the response signal 61. In the applied state, since the resonance circuit 50A is connected to the ground potential GND via the variable resistor 72, the applied state can be said to be a state in which the alternating current voltage 56B can be modulated (that is, a state in which the change in the load of the variable resistor 72 can be reflected in the modulation of the alternating current voltage 56B). In the non-applied state, since the resonance circuit 50A is not connected to the ground potential GND via the variable resistor 72, the non-applied state can be said to be a state in which the alternating current voltage 56B cannot be modulated (that is, a state in which the change in the load of the variable resistor 72 cannot be reflected in the modulation of the alternating current voltage 56B).

Then, in the applied state, the resistance value of the variable resistor 72 is controlled according to the bleed power 59 dissipated from the regulator 50C in order to generate the power 60. The resistance value of the variable resistor 72 is changed in the applied state, thereby changing the degree of modulation of the alternating current voltage 56B. That is, the modulation depth 56B1 of the alternating current voltage 56B is changed. Consequently, it is possible to suppress the occurrence of a situation in which the modulation depth 56B1 of the alternating current voltage 56B is extremely deep or extremely shallow (for example, the modulation depth 56B1 of the alternating current voltage 56B can be kept at a predetermined depth level).

As a result, the supply of the power 60 to the various circuits such as the computer 54 can be stabilized, and the content of the response signal 61 (that is, the result obtained by the processor 54A executing the processing corresponding to the command signal 48 provided from the reader/writer 46) can be accurately read by the reader/writer 46. In addition, since the supply of the power 60 to the processor 54A can be stabilized, it is possible to suppress the occurrence of a situation in which the writing of the management information 15 to the NVM 54B by the processor 54A and/or the reading of the management information 15 from the NVM 54B by the processor 54A are not performed, due to the shortage of the power 60 supplied to the processor 54A.

Additionally, in the present embodiment, a pair of variable resistance elements, that is, the variable resistance elements 72A and 72B, are connected to the resonance circuit 50A. Further, the pair of switches connected to the ground potential GND, that is, the switches 74A and 74B, are connected to the variable resistance elements 72A and 72B. The applied state in which the load of the variable resistor 72 is applied to the resonance circuit 50A is achieved in a case in which the switches 74A and 74B are turned on, and the non-applied state in which the load of the variable resistor 72 is not applied to the resonance circuit 50A is achieved in a case in which the switches 74A and 74B are turned off. Therefore, it is possible to achieve the switching between the applied state in which the load of the variable resistor 72 is applied to the resonance circuit 50A and the non-applied state in which the load of the variable resistor 72 is not applied to the resonance circuit 50A, with a simple configuration.

In addition, in the present embodiment, in a case in which the bleed power 59 is increased, the resistance value of the variable resistor 72 is reduced in accordance with the increase in the bleed power 59, and in a case in which the bleed power 59 is decreased, the resistance value of the variable resistor 72 is increased in accordance with the decrease in the bleed power 59. Consequently, a load corresponding to the bleed power 59 is applied to the resonance circuit 50A. As a result, it is possible to accurately achieve both stabilizing the supply of the power 60 to the various circuits such as the computer 54 and ensuring that the reader/writer 46 accurately reads the content of the response signal 61, as compared with a case in which the load to be applied to the resonance circuit 50A is increased or decreased without any reference to the bleed power 59.

Figure 10:
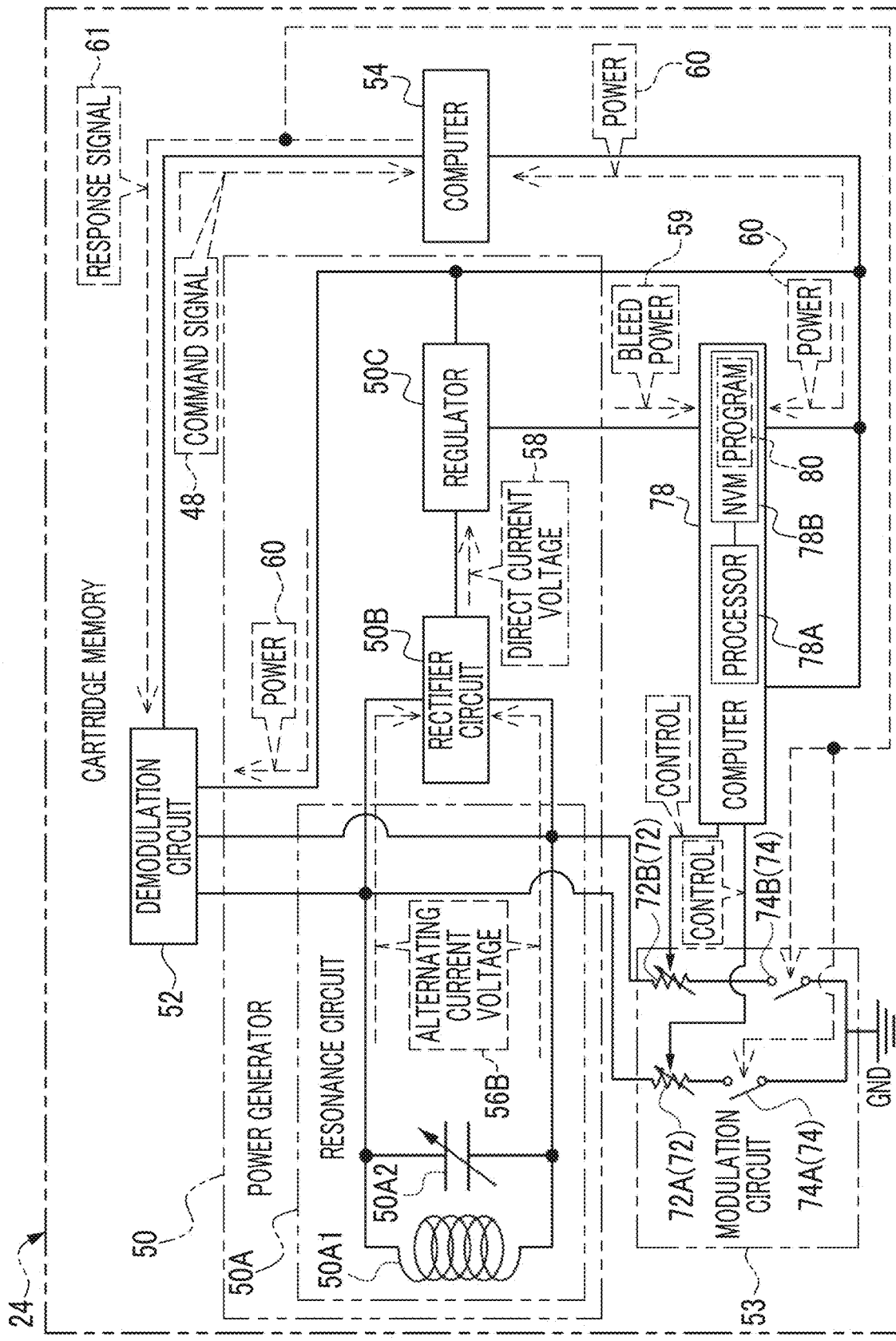
FIG. 10 is a conceptual diagram showing a modification example of the detailed hardware configuration of the electrical system of the cartridge memory.

In the above-described embodiment, a form example has been described in which the monitoring circuit 69 and the control circuit 70 are implemented by ASICs, but the present disclosure is not limited to this, and the monitoring circuit 69 and the control circuit 70 may be implemented by a software configuration. In this case, for example, as shown in FIG. 10, a computer 78 is applied instead of the monitoring circuit 69 and the control circuit 70. The computer 78 includes a processor 78A. In addition, the computer 78 includes an NVM 78B which is a computer-readable non-transitory storage medium. A program 80 is stored in the NVM 78B.

The processor 78A reads the program 80 from the NVM 78B and operates as the monitoring circuit 69 and the control circuit 70 in accordance with the program 80. As described above, even in a case in which the computer 78 is applied instead of the monitoring circuit 69 and the control circuit 70, the same effects as those of the above-described embodiment can be obtained. In the example shown in FIG. 10, the computer 78 is an example of a "computer" according to the present disclosure, and the program 80 is an example of a "program" according to the present disclosure.

In the above-described embodiment, although the cartridge memory 24 that performs communication with the reader/writer 46 in a noncontact manner has been described as an example, the present disclosure is not limited to this, and the present disclosure is also applicable to a noncontact communication medium other than the cartridge memory 24 (for example, a passive type RFID tag used in a technical field different from the present technical field).

In the above-described embodiment, although the reader/writer 46 mounted in the magnetic tape drive 14 has been exemplified, the present disclosure is not limited to this, and a reader/writer other than the reader/writer 46 (for example, a reader/writer used in a technical field different from the present technical field) may be used. In addition, an external device that performs writing or reading by performing communication with a noncontact communication medium, to which the present disclosure is applied, in a noncontact manner may be used.

In the above-described embodiment, although a stationary type reader/writer (that is, a reader/writer that is mounted in the magnetic tape drive 14) has been exemplified as the reader/writer 46, this is merely an example, and the present disclosure applies even to a portable type reader/writer. In addition, the stationary type or portable type reader/writer may be a reader/writer used in a technical field different from the present technical field.

In the above-described embodiment, the magnetic tape system 10 has been exemplified in which the magnetic tape cartridge 12 can be inserted and removed with respect to the magnetic tape drive 14, but the present disclosure is not limited to this. The present disclosure applies even to, for example, a magnetic tape system in which at least one magnetic tape cartridge 12 is loaded in advance into the magnetic tape drive 14 (that is, a magnetic tape system in which at least one magnetic tape cartridge 12 and the magnetic tape drive 14, or the magnetic tape MT and the magnetic tape drive 14 are integrated in advance (for example, before data is recorded on a data band)).

In the above-described embodiment, although a form example has been described in which the variable resistor 72 includes the variable resistance elements 72A and 72B, this is merely an example, and a circuit (for example, a circuit including a variable capacitor, a transistor, and the like) having the same function as that of the variable resistor 72 (that is, a function of applying a changeable load to the resonance circuit 50A) may be used.

The contents described and shown above are detailed descriptions of parts related to the present disclosure and are merely examples of the present disclosure. For example, the above descriptions relating to configurations, functions, actions, and effects are descriptions relating to an example of the configurations, functions, actions, and effects of the parts related to the present disclosure. Therefore, it goes without saying that unnecessary parts may be deleted, new elements may be added, or replacements may be made for the contents described and shown above within the scope that does not depart from the gist of the present disclosure.

Additionally, in order to avoid confusion and facilitate understanding of the parts related to the present disclosure, descriptions relating to common technical knowledge and the like that do not require particular descriptions to enable implementation of the present disclosure are omitted from the contents described and shown above.

In the present specification, "A and/or B" is synonymous with "at least one of A or B". That is, "A and/or B" means that only A may be used, only B may be used, or a combination of A and B may be used. Moreover, in the present specification, in a case in which three or more matters linked by "and/or" are expressed, the same concept as "A and/or B" is applied.

All documents, patent applications, and technical standards described in the present specification are incorporated by reference into the present specification to the same extent as in a case where the individual documents, patent applications, and technical standards were specifically and individually stated to be incorporated by reference.

What is claimed is:

1. A noncontact communication medium that performs communication with an external device in a noncontact manner via a magnetic field provided from the external device, the noncontact communication medium comprising:
    a resonance circuit that generates an alternating current voltage by resonating using an induced current induced in an antenna coil by the magnetic field acting on the antenna coil;
    a regulator that generates operating power for operating a processing circuit, from power based on a direct current voltage obtained by rectifying the alternating current voltage;
    a variable resistor connected to the resonance circuit;
    a switcher; and
    a control circuit,
    wherein the processing circuit is configured to generate a response signal corresponding to a command signal that is provided from the external device via the magnetic field,
    the switcher is configured to switch between an applied state in which a load of the variable resistor is applied to the resonance circuit, and a non-applied state in which the load is not applied to the resonance circuit, according to the response signal, and
    the control circuit is configured to control a resistance value of the variable resistor according to a bleed power dissipated from the regulator, to generate the operating power.

2. The noncontact communication medium according to claim 1,
    wherein the processing circuit is configured to
        execute processing corresponding to the command signal, and
        output a signal indicating a result obtained by executing the processing, as the response signal.

3. The noncontact communication medium according to claim 1,
    wherein the variable resistor is a pair of variable resistance elements connected to the resonance circuit,
    the switcher is a pair of switches that correspond to the pair of variable resistance elements and that are capable of connecting the pair of variable resistance elements and a ground potential to each other,
    the applied state is achieved in a case in which the pair of switches are turned on, and
    the non-applied state is achieved in a case in which the pair of switches are turned off.

4. The noncontact communication medium according to claim 1,
    wherein the control circuit is configured to
        reduce, in a case in which the bleed power is increased, the resistance value in accordance with the increase in the bleed power, and
        increase, in a case in which the bleed power is decreased, the resistance value in accordance with the decrease in the bleed power.

5. The noncontact communication medium according to claim 1, further comprising:
    a memory to which information is written by the processing circuit and/or from which information is read by the processing circuit.

6. The noncontact communication medium according to claim 1,
    wherein the noncontact communication medium is mounted in a magnetic tape cartridge.

7. A magnetic tape cartridge comprising:
    the noncontact communication medium according to claim 1.

8. A noncontact communication system comprising:
    the noncontact communication medium according to claim 1; and
    the external device.

9. An operation method of a noncontact communication medium that performs communication with an external device in a noncontact manner via a magnetic field provided from the external device, the noncontact communication medium including a resonance circuit that generates an alternating current voltage by resonating using an induced current induced in an antenna coil by the magnetic field acting on the antenna coil, a regulator that generates operating power for operating a processing circuit, from power based on a direct current voltage obtained by rectifying the alternating current voltage, a variable resistor connected to the resonance circuit, a switcher, and a control circuit, the operation method comprising:
    generating, via the processing circuit, a response signal corresponding to a command signal that is provided from the external device via the magnetic field;
    switching, via the switcher, between an applied state in which a load of the variable resistor is applied to the resonance circuit, and a non-applied state in which the load is not applied to the resonance circuit, according to the response signal; and
    controlling, via the control circuit, a resistance value of the variable resistor according to a bleed power dissipated from the regulator, to generate the operating power.

10. A non-transitory computer-readable storage medium storing a program executable by a computer provided in a noncontact communication medium that performs communication with an external device in a noncontact manner via a magnetic field provided from the external device, to execute a modulation process,
    wherein the noncontact communication medium includes
        a resonance circuit that generates an alternating current voltage by resonating using an induced current induced in an antenna coil by the magnetic field acting on the antenna coil,
        a regulator that generates operating power for operating a processing circuit, from power based on a direct current voltage obtained by rectifying the alternating current voltage,
        a variable resistor connected to the resonance circuit, and a switcher, the processing circuit is configured to generate a response signal corresponding to a command signal that is provided from the external device via the magnetic field, the switcher is configured to switch between an applied state in which a load of the variable resistor is applied to the resonance circuit, and a non-applied state in which the load is not applied to the resonance circuit, according to the response signal, and the modulation process includes controlling a resistance value of the variable resistor according to a bleed power dissipated from the regulator, to generate the operating power.

* * * * *